United States Patent [19]

Lippert

[11] Patent Number: 4,742,616

[45] Date of Patent: May 10, 1988

[54] CUTTING DEVICE

[75] Inventor: Troy D. Lippert, Claremore, Okla.

[73] Assignee: Hilti Aktiengesellschaft, Fürstentum, Liechtenstein

[21] Appl. No.: 942,543

[22] Filed: Dec. 16, 1986

[51] Int. Cl.[4] ........................ B23P 19/04; B21B 31/08

[52] U.S. Cl. .......................................... 30/124; 30/253

[58] Field of Search .................. 30/112, 124, 131, 253

[56] References Cited

U.S. PATENT DOCUMENTS

| | | | |
|---|---|---|---|
| 303,431 | 8/1884 | Hoffman | 30/131 |
| 496,407 | 5/1893 | Goldman | 30/124 X |
| 1,849,261 | 3/1932 | Winton | 30/253 X |
| 4,089,113 | 5/1978 | Moritz et al. | 30/253 |
| 4,092,774 | 6/1978 | Watts | 30/124 X |
| 4,158,914 | 6/1979 | Kurtz | 30/131 X |

*Primary Examiner*—E. R. Kazenske

*Assistant Examiner*—Michael D. Folkerts

*Attorney, Agent, or Firm*—Toren, McGeady & Associates

[57] ABSTRACT

A device for cutting open a discharge nozzle on a capsule containing a plastic mastic has a pair of elongated levers pivotally connected together adjacent first ends of the levers so that the levers are pivotally movable between an open position and a cutting position. One lever mounts a cutter and the other lever has a support bore aligned with the cutter in the cutting position. In the open position a discharge nozzle is inserted through the support bore extending toward the one lever and then the levers are pressed at the second ends into the cutting position whereby the cutter at least partially severs the nozzle. If necessary, the cut can be completed by rotating the device about the previously cut part of the nozzle.

1 Claim, 1 Drawing Sheet

CUTTING DEVICE

BACKGROUND OF THE INVENTION

The present invention is directed to a device for cutting a discharge nozzle of a capsule containing a plastic mastic.

Generally, capsules for plastic adhesives, sealants or fillers are made partly or completely of synthetic plastic material. To avoid any premature reaction or discharge of the material from the capsule, as a rule, the capsules are provided with a closed discharge nozzle. Consequently, when the material is to be used, the discharge nozzle on the capsule must be opened so that the contents can be pressed out. The discharge nozzle is opened by cutting off its end portion. In the past such a cutting step has been carried out with a knife or a fine saw. Even if a suitable bearing surface is available, the cutting operation is very laborious and time-consuming.

SUMMARY OF THE INVENTION

The primary object of the present invention is to provide a cutting device for a discharge nozzle on a capsule containing a plastic mastic or similar plastic material so that the nozzle can be severed simply, easily and quickly. In accordance with the present invention, a pair of shear-like levers are pivotally connected adjacent a first end of each lever and a grip is provided adjacent the second ends of the levers so that the levers can be pivoted from an open position into a cutting position. One lever is provided with a cutter between the grip and the pivotal connection with the other lever. The other lever has a support bore extending therethrough which aligns with the cutter in the cutting position.

By means of the cutting device of the present invention with the cooperation of the cutter and the support bore, a discharge nozzle can be cut open easily by the operator using only one hand to operate the cutting device. Such operation is particularly useful on a construction site. By positioning the cutter between the grip and the pivotal connection of the levers, leverage can be generated enabling a multiple of the applied gripping force to be transmitted as the cutting force.

To ensure effective guidance of the discharge nozzle, the support bore is formed with a cylindrical surface with the diameter of the bore corresponding essentially to the outside diameter of the discharge nozzle. With a circular support bore the cutting device can be rotated around the discharge nozzle. Accordingly, it is not necessary for the discharge nozzle to be severed completely in one cutting operation. As a result, the required pivoting angle of the levers relative to one another can be kept smaller and the applicable gripping force increased. Thus, for example, initially the discharge nozzle can be cut through half-way by pressing the two levers together and then the cut can be completed by rotating the device around the discharge nozzle.

Apart from initially cutting open the discharge nozzle, the device can also be used to effect a second cut if, after the capsule is not used for a long period, the mastic has hardened at the opening in the nozzle. Usually, hardened mastic is harder than the material forming the discharge nozzle. Due to this fact and also to normal wear, after a certain period of use the cutter becomes blunt. Accordingly, it is practical to provide the cutter as a disposable blade or as one which can be sharpened. The blade is secured on one of the levers by screws so that it can be quickly removed.

When severing a discharge nozzle, the operator can hold the capsule in one hand and the cutting device in the other. To facilitate such single-hand operation, it is advantageous to provide a stop on one of the levers to limit the open position of the levers. In such an arrangement, the levers can be held in the open position by a spring member.

Capsules very often have contents which are sticky or cause corrosion in other materials. To avoid any contamination of the surrounding area by the part cut from the discharge nozzle, the lever with the cutter can be provided with a receiving chamber adjacent the cutter for receiving the part of the discharge nozzle severed in the cutting operation. The receiving chamber contains the severed part of the discharge nozzle in the cutting device and, without touching the severed part, the operator can dispose of it in a waste container. In this way, the operator's hands are protected from contact with the mastic.

The various features of novelty which characterize the invention are pointed out with particularity in the claims annexed to and forming a part of this disclosure. For a better understanding of the invention, its operating advantages and specific objects attained by its use, reference should be had to the accompanying drawings and descriptive matter in which there are illustrated and described preferred embodiments of the invention.

DETAILED DESCRIPTION OF THE INVENTION

Figure 2:
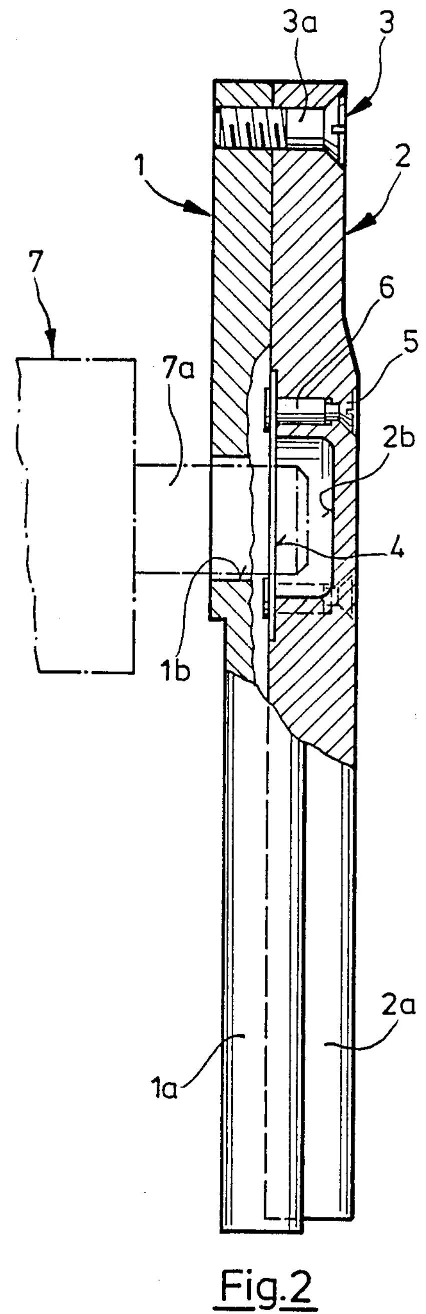
FIG. 2 is a side view, partly in section, taken in the direction of the arrow A in FIG. 1 with a portion of a capsule and discharge nozzle shown in phantom.

In the drawing the cutting device comprises an elongated first lever 1 and an elongated second lever 2 formed as a shear-like member. First and second levers 1 and 2 are pivotally connected at their first ends by a pivot member 3. The pivot member 3 is a screw 3*a*. At the second ends opposite the pivot member 3, each of the first and second levers 1, 2 has a grip 1*a*, 2*a*. Grip 2*a* is shaped to receive the operator's fingers. Between the grip 2*a* and the pivot member 3, the second lever 2 has a cutter 4. Cutter 4 is a replaceable blade and is secured to the second lever 2 by screws 5 and threaded sleeve 6, note FIG. 2.

Figure 1:
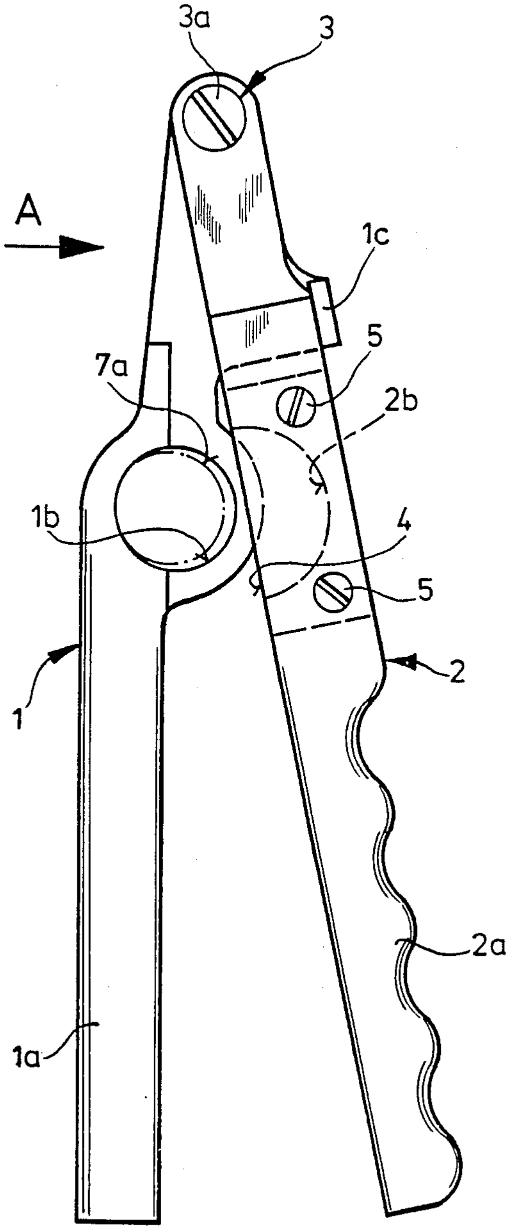
FIG. 1 is an elevational view of a cutting device embodying the present invention and illustrated in the open position.

First lever 1 has a circular support bore 1*b* located opposite the cutter in the open position in FIG. 1. The inside diameter of the support bore 1*b* corresponds essentially to the outside diameter of a discharge nozzle 7*a* on the capsule 7 so that the support bore holds and guides the discharge nozzle. A stop 1*c* is located on the first lever 1 between the location of the support bore 1*b* and the pivot member 3 for limiting the angle between the first and second levers 1 and 2 in the open position as displayed in FIG. 1. Second lever 2 has a receiving chamber 2*b* in the region of the cutter so that it receives the severed part of the discharge nozzle 7*a*.

To open the capsule 7, its discharge nozzle 7*a* is inserted through the circular support bore 1*b* so that it projects from the first lever 1 toward the second lever 2 in the open position as depicted in FIG. 1. The length of the part of the discharge nozzle *7a* to be severed can be predetermined by a suitable marking on the nozzle or by a suitable depth of the receiving chamber 2*b* in the second lever 2 inwardly from the cutter 4. With the discharge nozzle *7a* inserted through the support bore 1*b*, the first and second levers 1, 2 are pivoted toward one another into the cutting position where the levers at least partly overlap. As the levers move into the cutting position, cutter 4 cuts approximately half-way through the cross-section of the discharge nozzle *7a* with the first and second levers being parallel to one another. Subsequently, by rotating the cutting device around the discharge nozzle the remaining part of the cross-section of the discharge nozzle *7a* can be severed. The cut part of the discharge nozzle is retained in the receiving chamber 2*b* of the second lever 2 and the operator can then drop it into a waste container. Accordingly, contamination of the surrounding area by mastic adhering to the part is avoided. The entire cutting operation takes only a few seconds and requires relatively little gripping power because of the leverage.

While specific embodiments of the invention have been shown and described in detail to illustrate the application of the inventive principles, it will be understood that the invention may be embodied otherwise without departing from such principles.

I claim:

1. A device for cutting a discharge nozzle on a capsule containing a plastic mastic comprising a first and a second elongated lever each having a first end and a second end spaced apart in the elongated direction, said first and second levers each having a first side surface and an opposite second side surface with said first surfaces disposed in facing relation and extending between the first and second ends, said first and second levers being pivotally connected together adjacent the first ends thereof so that said first and second levers can be pivoted between an open position with the second ends of said levers in angularly spaced relation and a cutting position with said first surfaces of first and second levers being in overlapping and contact relation from the pivotal connection toward the second ends, each of said first and second levers having a grip portion adjacent the second ends thereof, said second lever having a cutter removably secured on the first surface thereof and located between said grip thereon and the pivotal connection with said first lever, said first lever having a support bore extending therethrough from the first surface to the second surface for receiving the discharge nozzle to be cut with the support bore being aligned opposite said cutter in the cutting position so that as said first and second cutters are pivoted from the open position to the cutting position with a discharge nozzle extending through said bore beyond said first surface of said first lever and toward said second lever, said cutter at least partly shears off the part of said discharge nozzle extending from said support bore toward said second lever, said support bore having a circular surface corresponding substantially with the outside diameter of the discharge nozzle to be cut, means for replaceably securing said cutter on said second lever, and said second lever having a receiving chamber formed therein aligned with said cutter for receiving the part of the discharge nozzle severed by the cutter, said receiving chamber extending inwardly from said cutter at said first surface and having a closed base between the first and second surfaces.

* * * * *